United States Patent
Mayle et al.

(10) Patent No.: US 11,340,100 B2
(45) Date of Patent: May 24, 2022

(54) METHOD FOR EVALUATING MEASUREMENT DATA SEQUENCES OF AN ULTRASONIC FLOW MEASURING DEVICE AND ULTRASONIC FLOW MEASURING DEVICE

(71) Applicant: DIEHL METERING GMBH, Ansbach (DE)

(72) Inventors: Michael Mayle, Ansbach (DE); Andreas Madinger, Rosstal (DE); Ulrich Gaugler, Weidenbach (DE); Alexander Hofmann, Sachsen (DE)

(73) Assignee: Diehl Metering GmbH, Ansbach (DE)

( * ) Notice: Subject to any disclaimer, the term of this patent is extended or adjusted under 35 U.S.C. 154(b) by 288 days.

(21) Appl. No.: 16/660,086

(22) Filed: Oct. 22, 2019

(65) Prior Publication Data
US 2020/0182667 A1    Jun. 11, 2020

(30) Foreign Application Priority Data
Dec. 8, 2018  (DE) .......................... 102018009664.6

(51) Int. Cl.
*G01F 1/66*  (2022.01)
*G01F 1/667*  (2022.01)

(52) U.S. Cl.
CPC .............. *G01F 1/662* (2013.01); *G01F 1/667* (2013.01)

(58) Field of Classification Search
CPC ................................. G01F 1/662; G01F 1/667
See application file for complete search history.

(56) References Cited

U.S. PATENT DOCUMENTS 6,535,206 B1 *  3/2003  Xu .................... G06F 3/0346
                                                 178/18.01
8,103,461 B2    1/2012  Glaser et al.
(Continued)

FOREIGN PATENT DOCUMENTS

DE    102005015456 A1    10/2006

OTHER PUBLICATIONS

Zehua Fang, et al.: "Similarity Judgement-Based Double-Threshold Method for Time-of-Flight Determination in an Ultrasonic Gas Flowmeter"; IEEE Transactions on Instrumentation and Measurement, vol. 67, No. 1, pp. 24 to 32; Jan. 2018.

*Primary Examiner* — Manuel A Rivera Vargas
*Assistant Examiner* — Yaritza H Perez Bermudez
(74) *Attorney, Agent, or Firm* — Laurence A. Greenberg; Werner H. Stemer; Ralph E. Locher (57) ABSTRACT

A method for evaluating discrete measurement data sequences of an ultrasonic flow measuring device having a recording frequency and ultrasound signal, includes determining time position or height of a maximum of a sinusoidal profile of a time sequence of evaluation values, determined as part of a measurement data sequence or cross-correlation of two sequences recorded at different positions of the device by determining a maximum evaluation value of the time sequence and evaluation values thereof adjacent thereto. Initial values, including an initial maximum value and time, are determined by quadratic fit of evaluation values. Output values including output time describing the position or output height describing the height of the maximum are determined by a determination relationship setting output values in relation with initial values and a calculation quantity formed from selected evaluation values for known recording frequency and known signal frequency and based on a known sinusoidal profile.

12 Claims, 5 Drawing Sheets

(56) References Cited

U.S. PATENT DOCUMENTS

| | | | |
|---|---|---|---|
| 9,689,726 B2 | 6/2017 | Ramamurthy et al. | |
| 10,801,868 B2* | 10/2020 | Dabak | G01F 1/662 |
| 2002/0143479 A1* | 10/2002 | Fukuhara | G01F 1/7082 |
| | | | 702/45 |
| 2005/0288873 A1* | 12/2005 | Urdaneta | G01F 1/66 |
| | | | 137/487.5 |
| 2014/0012518 A1* | 1/2014 | Ramamurthy | G01F 1/668 |
| | | | 702/48 |
| 2014/0107950 A1* | 4/2014 | Dabak | G01F 1/66 |
| | | | 702/48 |
| 2014/0303910 A1* | 10/2014 | Dabak | G04F 10/00 |
| | | | 702/48 |
| 2014/0318268 A1* | 10/2014 | Sorensen | G01F 1/66 |
| | | | 73/861.27 |
| 2015/0355001 A1* | 12/2015 | Dabak | G01F 1/667 |
| | | | 702/48 |
| 2016/0334250 A1 | 11/2016 | Sathyanarayana et al. | |

* cited by examiner

METHOD FOR EVALUATING MEASUREMENT DATA SEQUENCES OF AN ULTRASONIC FLOW MEASURING DEVICE AND ULTRASONIC FLOW MEASURING DEVICE

CROSS-REFERENCE TO RELATED APPLICATION

This application claims the priority, under 35 U.S.C. § 119, of German Patent Application DE 10 2018 009 664.6, filed Dec. 8, 2018; the prior application is herewith incorporated by reference in its entirety.

BACKGROUND OF THE INVENTION

Field of the Invention

The invention relates to a method for evaluating discrete measurement data sequences of an ultrasonic flow measuring device, recorded with a recording frequency and respectively describing an at least substantially sinusoidal ultrasound signal with a signal frequency, which includes determining the time position and/or height of at least one maximum of the at least substantially sinusoidal profile of a time sequence of evaluation data, which is determined as at least a part of a measurement data sequence and/or at least a part of a cross-correlation of two measurement data sequences recorded at different measurement positions of the ultrasonic flow measuring device. The invention furthermore relates to an ultrasonic flow measuring device.

In the field of flow measuring devices, for example for water meters and the like, measurement methods have already been proposed which are based on the propagation of ultrasound signals through the medium to be measured. In that case, an ultrasonic flow measuring device includes at least one ultrasound transducer, usually a plurality of ultrasound transducers, through the use of which ultrasound signals are respectively emitted along measurement paths through the medium to be measured and received. In particular, it is thus possible to determine the flow velocity of the medium by using absolute times of flight of the ultrasound signals and/or phase shifts of ultrasound signals received at different measurement positions in relation to one another.

In order to evaluate measurement data of the ultrasound transducers, microelectronic components for digital signal processing and analog-digital converters (ADC) which can be operated with extremely remote electrical power, have already been proposed. In particular, in that case operation is carried out with a particularly low recording frequency, and therefore sampling rates, in order to be able to comply with great restrictions in relation to the electrical power consumption. The sampling rates (recording frequencies) used are in that case, for example, only slightly above the Nyquist limit. A second restriction in terms of the power consumption as well as economical implementability is the desire for as great as possible a reduction of the digital signal processing, and the complexity thereof, required for the postprocessing of the measurement data sequences.

One widespread evaluation variant for measurement data sequences recorded in an ultrasonic flow measuring device includes determination of the true position and amplitude of a sine peak, and therefore the maximum of an at least substantially sinusoidal profile. Examples thereof include finding the maximum of two cross-correlated measurement data sequences (and therefore ultrasound signals) in order to measure the time-of-flight difference of two ultrasound signals, for example an ultrasound signal measured upstream and an ultrasound signal measured downstream. Another example relates to identification of a particular maximum within a measurement data sequence, which describes an ultrasound signal, by its (relative) height. In that way, for example, an absolute time of flight (ToF) may be determined.

One exemplary method for time-of-flight determination in an ultrasonic gas fluid meter is described in an article by Zehua Fang, et al., entitled "Similarity Judgment-Based Double-Threshold Method for Time-of-Flight Determination in an Ultrasonic Gas Flowmeter", in IEEE Transactions on Instrumentation and Measurement 67 (2018), pages 24 to 32. In that case, the amplitude information of selected maxima within the ultrasound signal described by a measurement data sequence may be used.

U.S. Pat. No. 9,689,726 B2 discloses a flow measuring device which is intended to measure a flow velocity in a tube by ultrasound. In that case, ultrasound signals that are received by ultrasound transducers are digitized, and the difference between two ultrasound times of flight is determined by determining a discrete cross-correlation of the digitized received signals, i.e. the measurement data sequences. Calculation time is intended to be reduced by determining only a few cross-correlation values close to a cross-correlation maximum. Therein, in particular, details may also be found concerning the way in which a discrete cross-correlation sequence is determined from two measurement data sequences relating to different ultrasound signals. Like the measurement data sequences, the resulting cross-correlation sequence follows the at least substantially sinusoidal profile.

In U.S. Pat. No. 9,689,726 B2, it is recognized that the shape of the cross-correlation function through the sought maximum is approximately a cosine curve or a parabola curve. Correspondingly, a quadratic interpolation (for the parabola) or a cosine interpolation is proposed. The quadratic interpolation in this case is particularly simple to implement and may be carried out in particular while saving on electrical power. Although a cosine interpolation is significantly more accurate in terms of the desired application, it is extremely complex to implement, in particular significantly more calculation-intensive and therefore also more intensive in terms of electrical power consumption. For that reason, although cosine interpolations are currently used in ultrasonic flow measuring devices, they have entailed negation of many advantages, in particular a longer lifetime of an electrical battery or, for the same lifetime, a higher measurement rate (number of flow measurements per second).

In order to improve the quality of the quadratic interpolation, it has already been proposed to provide an upsampling method in a postprocessing step. The upsampling itself, however, in turn requires electrical power and the subsequent digital signal processing steps then likewise require more electrical power, since the digitized signal contains more measurement data that need to be processed.

SUMMARY OF THE INVENTION

It is accordingly an object of the invention to provide a method for evaluating measurement data sequences of an ultrasonic flow measuring device and an ultrasonic flow measuring device, which overcome the hereinafore-mentioned disadvantages of the heretofore-known methods and devices of this general type and which provide a possibility for the evaluation of measurement data in an ultrasonic flow measuring device with digital signal processing, which with reduced complexity requires the use of the least possible electrical power.

With the foregoing and other objects in view there is provided, in accordance with the invention, a method for evaluating discrete measurement data sequences of an ultrasonic flow measuring device, recorded with a recording frequency and respectively describing an at least substantially sinusoidal ultrasound signal with a signal frequency, in which the following steps are carried out in order to determine the time position and/or height of at least one maximum of the at least substantially sinusoidal profile of a time sequence of evaluation values, which is determined as at least a part of a measurement data sequence and/or at least a part of a cross-correlation of two measurement data sequences recorded at different measurement positions of the ultrasonic flow measuring device:

determining a maximum evaluation value of the time sequence and at least two evaluation values of the time sequence which are adjacent the maximum evaluation value, determining initial values, including an initial maximum value and an initial maximum time, by quadratic fit of the selected evaluation values, and determining output values including an output time describing the position of the maximum and/or an output height describing the height of the maximum by using a determination relationship which sets the output values in relation with the initial values and at least one calculation quantity formed from the selected evaluation values for a known recording frequency and a known signal frequency and is derived on the basis of the known sinusoidal profile.

As is widely known, measurement data are thus recorded by at least one ultrasound transducer at defined time intervals, which define the recording frequency (sampling rate). The corresponding discrete measurement data sequences therefore describe an at least substantially sinusoidal ultrasound signal, which therefore contains sine waves with a predetermined signal frequency. In this case it is conventional, and in particular also preferable in the scope of the present invention, for an ultrasound signal described by an envelope curve, initially increasing in its amplitude and then decreasing to zero, to be used and measured with the aid of the measurement data, so that minor deviations from a pure sinusoidal profile of a sine signal with the signal frequency may occur which, in the region of the individual maxima of the at least substantially sinusoidal profile, may optionally be negligible in many cases, which will be discussed in more detail below, but may also be taken into account by the determination relationship. From the at least one measurement data sequence, an evaluation sequence is then derived, depending on the way in which the output values to be determined are to be further used. For example, it may be that the particular output values are used for determining a time-of-flight difference and/or and absolute time of flight of the ultrasound signals, or of the ultrasound signal. Basic procedures for determining times of flight or time-of-flight differences (TOF and dTOF, respectively) are for example mentioned in the document by Fang, et. al. and U.S. Pat. No. 9,689,726 B2, which were mentioned in the introduction.

In the case of determining a time-of-flight difference, a discrete cross-correlation sequence or individual values thereof from the measurement data sequences for the two ultrasound signals are used, which may be carried out easily in the scope of digital signal processing. In the case of an absolute time of flight, the measurement data sequence may be used directly. In order to determine the evaluation sequence, for example, a maximum of the at least substantially sinusoidal profile is to be selected, the precise position and/or height of which is of interest. The measurement data, or cross-correlations, lying around this (local) maximum, then form the corresponding time sequence of evaluation values. In this case, it is specifically assumed that the recording frequency is selected in such a way that it in fact lies only just above the Nyquist frequency.

The basic concept of the invention is then first to carry out the quadratic fit (parabola of interpolation) which can be carried out simply and with low electrical power, and then to correct the result values of the quadratic fit for the time position and amplitude, i.e. location and height, of the maximum. The correction is derived from precise knowledge about the error occurring when fitting a parabola to a sine function. This thus means that knowledge about the actually underlying function type of the ultrasound signal is used in order to derive in a controlled way a correction that can be applied simply to the results of the quadratic fit. In this way, more accurate values are determined than in the case of an uncorrected quadratic interpolation. In particular, however, the quadratic interpolation followed by a correction by the determination relationship is significantly simpler to implement and faster to carry out and has less power requirement than a cosine interpolation. Furthermore, the need for upsampling is advantageously avoided. Since the correction described by the determination relationship is a function of the recording frequency and the signal frequency, i.e. the sampling rate and the dominant frequency of the sampled signal, the correction may be applied without restrictions, even in the event of a variation of these parameters. In summary, knowledge about the underlying signal shape is thus used in order to increase the accuracy of the maximum determination.

Specifically, three evaluation values lying in the region of the maximum to be found as accurately as possible are selected initially from the time sequence of evaluation values, specifically the value forming the corresponding local maximum in the time sequence and the two adjacent values, for which precisely one parabola that contains all three selected evaluation values may be defined uniquely and accurately in a simple fashion. In particular, the correspondingly resulting formula for the height of the maximum and the position of the maximum, and therefore the initial values of the quadratic fit, may also be specified analytically for such a case, which may be expedient in the scope of at least partial analytical derivation of the determination relationship. The determination relationship then uses the initial values of the quadratic fit, the recording frequency (usually predetermined), the signal frequency (usually known) and a calculation quantity which substantially combines the selected evaluation values, in order to determine the output values as corrected initial values. The selection of the calculation quantity in this case is ideally to be made in such a way that no further dependencies on the selected evaluation values (and their measurement times) occur. In particular, with a fixed known recording frequency and a fixed known signal frequency, a determination relationship only further parameterized by the calculation quantity is obtained, which may thus be implemented simply, in particular as a look-up table or alternatively as a mathematical function. A look-up table in the case of a fixed recording frequency and fixed signal frequency for the ultrasonic flow measuring device may therefore be used substantially as characteristic curves. It is, however, also conceivable to use higher-dimensional characteristic fields while incorporating the recording frequency and/or signal frequency.

In one specific embodiment of the present invention, for example, the difference of the selected evaluation values adjacent the maximum evaluation value divided by the selected maximum evaluation value may be selected as the calculation quantity. This selection is expedient particularly with a view to analytical derivation of the determination relationship. The difference between the position of the selected maximum evaluation value and the position of the initial maximum, i.e. the initial maximum time, has proven suitable as another option for a calculation quantity, which may be determined particularly simply by digital electronics.

The determination relationship may thus be derived at least partially analytically. The derivation of an analytically expressible formula may simplify implementation as a mathematical function, particularly in a microelectronic component for digital signal processing. In one specific configuration of the present invention, for analytical derivation of the determination relationship on the basis of a fit relationship linking the initial maximum time and the initial maximum value with the selected evaluation values, the time of the maximum evaluation value and the recording frequency, a base function describing the sinusoidal profile is applied, the selected evaluation values forming function values of the base function at their measuring times and the output values being taken as describing the maximum of the base function lying in the range of the selected evaluation values, an intermediate relationship between the initial values and the output values is formulated, and reformulated by using the calculation quantity of the intermediate relationship in the determination relationship.

The fit relationship is therefore the already mentioned analytically known functional relationship between three points on a parabola (the selected evaluation values and their measurement times) and the position and height of the maximum of the parabola, i.e. the initial values. If three points that actually lie on a known sine function, i.e. the base function, are then selected at the start for determining the determination relationship, its real maximum in height and position is also previously known, so that an intermediate relationship between the initial maximum value and the output height and between the initial maximum time and the output time may be analytically expressed. If the calculation quantity defined in an expediently selected way is then used, a dependency on the respective initial values and the calculation quantity, the signal frequency and the recording frequency may be analytically derived for both output values. For example, if f denotes the signal frequency and fs denotes the recording frequency, the selected maximum evaluation value is furthermore denoted by s0 and the further selected evaluation values are denoted by s− and s+, where s−<s0 and s+<s0, then with a selection of $$\tilde{\Delta} = \frac{s_+ - s_-}{s_0} \tag{0}$$

as a calculation quantity, Amax and tmax may be formulated for the output values.

$$A_{max} = A_{fit} \frac{\sqrt{1 + \frac{\tilde{\Delta}^2}{4\sin^2(2\pi f / f_s)}}}{\left(1 + \frac{\tilde{\Delta}^2}{32\sin^2(\pi f / f_s)}\right)} \tag{1}$$

and $$t_{max} = t_{fit} - \epsilon_t, \tag{2}$$

$$\epsilon_t = \frac{1}{2\pi f}\left[\frac{\pi f}{4 f_s} \frac{\tilde{\Delta}}{\sin^2(\pi f / f_s)} - \tan^{-1}\left(\frac{\tilde{\Delta}}{2\sin(2\pi f / f_s)}\right)\right],$$

where Afit and tfit represent the initial values from the quadratic fit.

In particular, for the case in which the determination relationship is intended to be used as a mathematical function, it may be expedient to further simplify the equations found under (1) and (2), since this also assists implementation with low energy consumption in microelectronic components for digital signal processing. According to one expedient refinement of the present invention in this context, therefore, the analytically determined determination relationship is simplified by at least one approximation method for simpler implementation in digital signal processing, in particular by a linear or quadratic approximation method and/or by using a Taylor expansion. In this way, simpler approximated expressions may be used for the correction, which leads to simpler implementation and therefore a reduced power requirement.

Approximation methods are usually related to particular validity intervals of the calculation quantity, for example in a range of low values for the calculation quantity in the case of a Taylor expansion. In order to nevertheless meaningfully cover all occurring calculation quantities by simplified approximated expressions in the determination relationship, it may be expedient to apply a plurality of approximation methods for different validity intervals of the calculation quantity, with the determination relationship determined from the assigned approximation method being used according to the current value of the calculation quantity.

For example, a plurality of partial determination relationships may thus be used for different, in particular nonoverlapping validity intervals using different approximation methods, with the corresponding partial determination relationship being used as a function of the current value of the calculation quantity.

It may also be expedient in the scope of the present invention for the determination relationship to be at least partially empirically determined. An empirical determination may, on one hand, already be determined for the underlying relationship of initial values and output values by using the calculation quantity, for example by selecting three points on a predetermined base function (sine function), which correspond in their time spacings to the recording frequency, converting these by a quadratic fit into initial values, which may be listed with the output values actually known on the basis of the base function in order to generate a look-up table, or even to establish the determination relationship as a mathematical function at least approximately yielding the respective value pairs.

On the other hand, however, an empirical approach may also be used to improve at least partially analytically determined determination relationships. As already mentioned, the amplitudes of ultrasound signals in an ultrasound pulse are usually determined by using an envelope curve, i.e. they initially influence before decreasing after a maximum value.

Depending on whether the range in question is an increasing or decreasing range or on the appearance of the slope of the envelope, certain deviations from the pure sinusoidal profile occur. These may likewise be taken into account by using correction factors or the like, which may be determined empirically. According to one advantageous refinement of the invention, therefore, an ultrasound signal described by an envelope curve, initially increasing in its amplitude and then decreasing to zero, which may also be understood as an ultrasound pulse, is used and measured with the aid of the measurement data sequences, the at least partially empirical determination being carried out separately for the region of increasing amplitudes and the region of decreasing amplitudes and/or as a function of the slope value of the envelope curve, and the determination relationship differing between these regions and/or being determined as a function of the slope value. In other words, the asymmetry occurring because of the use of the envelope curve may be taken into account empirically, if peaks, i.e. maxima, on a rising or falling edge of the envelope curve are intended to be determined. This empirically determined additional correction may, for example, be made dependent on the slope of the envelope curve at the corresponding peak position.

According to another advantageous refinement of the present invention, the determination relationship is adapted as a function of calibration data of a calibration measurement. This means that, for example, a calibration measurement carried out with a greater time resolution than the flow measurement may be repeated regularly and/or under particular circumstances, in order for example to adapt the correction to current ambient conditions. In particular, when it is preferred for the calibration measurement to have a higher time resolution i.e. to have in particular a higher recording frequency for the calibration data, although a higher electrical power is required for a very short period of time, this is nevertheless tolerable for the accuracy improvement overall. In this case, the calibration measurement may in principle be aimed at different parameters, for example parameters also to be optimized empirically, for example the behavior at different positions along an envelope curve of an ultrasound signal (i.e. an ultrasound pulse).

In the scope of the present invention, however, it is particularly preferred for the calibration measurement to be used for determining the signal frequency. This means that the signal frequency, which as explained may in principle also be included in the determination relationship, may be determined, for example for current ambient conditions, in order to provide the most accurate possible correction, i.e. the signal frequency determined in this way is used in the determination relationship which is also determined as a function of the signal frequency. For example, there may be different look-up tables for different signal frequencies, and/or a mathematical function may explicitly have a dependency on the signal frequency. This is expedient in particular to the extent that, by different effects inside the ultrasonic flow measuring device, variations of the signal frequency may occur with changing ambient conditions, in particular a changing ambient temperature. Specifically, for example, the signal frequency may be determined from the calibration data by a Fourier analysis (as the dominant mode), or alternatively by simple determination of the length of the period between two maxima. Also for the signal frequency and calibration parameters to be determined from the calibration data, it is the case that the calibration measurement does not of course have to be carried out before each maximum determination according to the present invention, but only occasionally, or rather when a change in the signal frequency is expected, for example in the event of a temperature change.

In general, it may thus be stated that a repetition of the calibration measurement is carried out cyclically and/or when at least one ambient criterion evaluating an ambient condition is satisfied, particularly in the event of a change, exceeding a threshold value, in the temperature, for example to a value for which there are no calibration data (or calibration parameters derived therefrom). Of course, when only the current calibration parameters are stored, a new calibration measurement may also be carried out whenever there is a temperature change exceeding the threshold value.

Overall and in general, it may be stated that the present invention provides an accuracy-improving solution for the evaluation of measurement data sequences of an ultrasonic flow measuring device, which is tailored to the requirements and conditions in such ultrasonic flow measuring devices, i.e. in particular the required low demand for electrical power or electrical energy and implementation which is as simple as possible, particularly in comparison with a cosine interpolation. This means that the evaluation may conventionally be carried out by at least one microelectronic component for digital signal processing, which belongs to a control device of the ultrasonic flow measuring device. Depending on whether a functional determination relationship that is sufficiently simple to implement is obtained, the determination relationship is determined and/or used as a look-up table relating at least to the calculation quantity and/or as a mathematical function. In other words, in general it may thus also be stated that the method according to the invention for evaluating discrete measurement data sequences of an ultrasonic flow measuring device, recorded with a recording frequency and respectively describing an at least substantially sinusoidal ultrasound signal with a signal frequency, may be understood as a method for operating the ultrasonic flow measuring device.

With the objects of the invention in view, there is concomitantly provided an ultrasonic flow measuring device, comprising at least one ultrasound transducer and a control device which evaluates measurement data of the at least one ultrasound transducer and includes an analog-digital converter and at least one microelectronic component for digital signal processing, and is configured for carrying out the method according to the invention. All comments relating to the method according to the invention may be applied similarly to the ultrasonic flow measuring device according to the invention, with which the advantages already mentioned may therefore likewise be obtained.

Other features which are considered as characteristic for the invention are set forth in the appended claims.

Although the invention is illustrated and described herein as embodied in a method for evaluating measurement data sequences of an ultrasonic flow measuring device and an ultrasonic flow measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
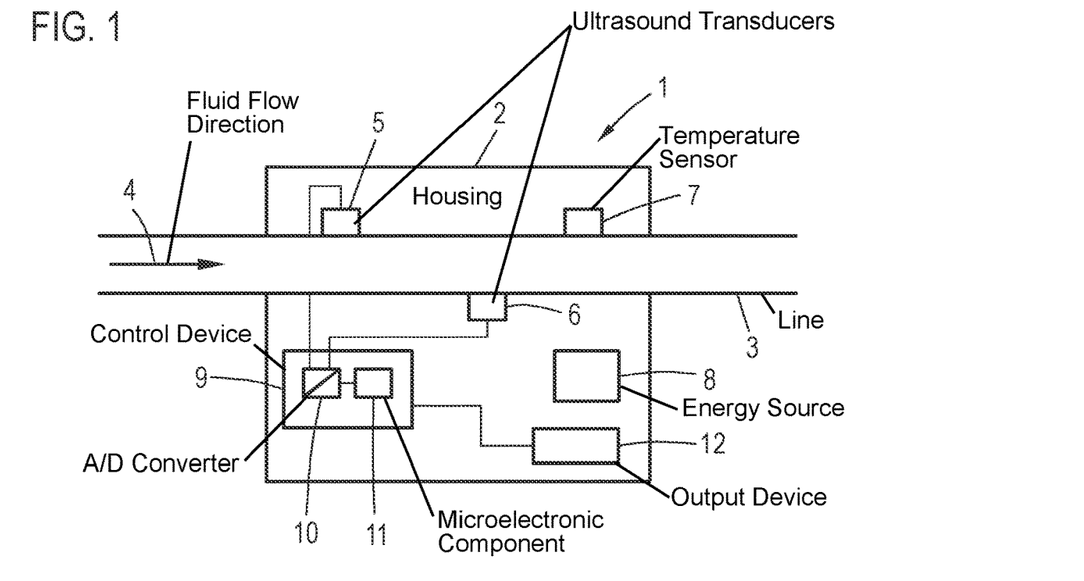
FIG. 1 is a block or outline diagram of an ultrasonic flow measuring device according to the invention.

Referring now to the figures of the drawings in detail and first, particularly, to FIG. 1 thereof, there is seen an outline diagram of an ultrasonic flow measuring device 1 according to the invention. The ultrasonic flow measuring device 1 includes a housing 2, through which a line 3, in particular a tube, is fed. A fluid can flow through the line 3 in a flow direction 4.

In the present case, by way of example, two ultrasound transducers 5, 6 are disposed in the housing 2 on the line 3 in such a way that they can emit and receive ultrasound signals through the fluid. The measurement position of the ultrasound transducer 5 in this case is conventionally referred to as "upstream" and the measurement position of the ultrasound transducer 6 as "downstream." The line 3 may furthermore also be assigned a temperature sensor 7 for measuring the temperature of the fluid.

During operation of the ultrasonic flow measuring device 1, the flow velocity of the fluid (medium) is intended to be determined from the times of flight of ultrasound signals, from which a flow quantity may for example in turn be derived. To this end, in the present case, ultrasound signals are used which substantially use a sine profile with a fixed signal frequency, the amplitude profile of which is a function of time and is, however, determined by an envelope curve so that the heights of the respective maximum of the sine oscillation of the signal frequency increase to a maximum amplitude (range of increasing amplitudes) and then correspondingly decrease (range of decreasing amplitudes). Such an ultrasound signal thus has a time duration described by the envelope curve and may be understood as an ultrasound pulse.

The reception of the respective ultrasound signal at the corresponding measurement positions, ultrasound transducers 5, 6, is measured with a particular sampling rate, i.e. a recording frequency. Measurement data sequences as a function of time that describe the profile of the ultrasound signal as a function of time are therefore formed. In order to save as much as possible on electrical power and therefore also electrical energy from an electrical energy source 8, for example a battery, the recording frequency is selected to be only just above the Nyquist limit. For example, the recording frequency may be less than double the Nyquist frequency. Values which may be used by way of example are 1 megahertz for the signal frequency and 3.6 megahertz for the recording frequency. This, however, means that there are in each case only a few measurement points for the measured sine half-wave, forming a maximum, of the ultrasound signal. This correspondingly also applies when a discrete cross-correlation sequence is formed from the measurement data sequences obtained upstream and downstream and their (central) maximum is sought.

In order to evaluate the measurement data of the ultrasound transducers 5, 6, the ultrasonic flow measuring device 1 includes a control device 9, which in the present case includes an analog-digital converter 10 (ADC) and at least one microelectronic component 11 for digital signal processing. Conventionally, the ultrasonic flow measuring device also includes an output device 12, for example a display apparatus and/or a data interface for sending measured flow quantities.

Figure 3:
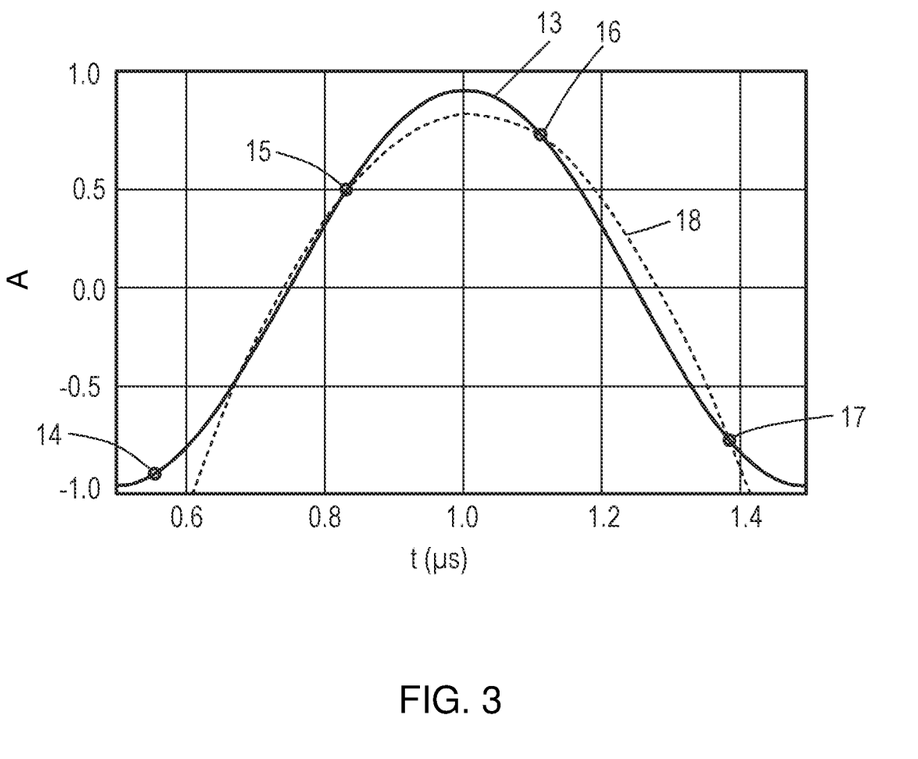
FIG. 3 is a diagram showing a deviation of a quadratic fit from a sinusoidal profile.

In particular, the at least one microelectronic component 11 of the control device 9 is intended, for maximally accurate determination of the position of a relevant maximum of a sinusoidal profile, for example of a half-wave of the ultrasound signal or of the cross-correlation signal, to be implementable as simply as possible and require as little electrical power as possible. The cosine fit which is expedient for high-accuracy determination of the position and height of such a maximum, or the corresponding cosine interpolation, may be implemented only with great complexity and high power requirement, while the quadratic fit for the sinusoidal signal profile, which is simple to implement and requires little electrical power, is rather inaccurate, as shown by FIG. 3. The solid curve 13 shows the sinusoidal profile of a half-wave of the ultrasound signal, of which measurement values 14, 15, 16, 17 are recorded as a measurement data sequence at fixed time intervals according to the recording frequency, in this case for example 3.6 megahertz. The measurement value 16 in this case is the greatest, so that for example it and the two adjacent measurement values 15, 17 may be used for a quadratic fit, which is shown by the dashed curve 18 and is uniquely determined. As can be seen, the maximum of the dashed curve 18 and the maximum of the solid curve 13 differ significantly from one another both in time position and in height, so that it can be seen that the quadratic fit has an error.

Through the use of the microelectronic component 11 of the control device 9 in the present case, in the scope of the configuration of the control device 9 for carrying out the method according to the invention, a further correction is therefore also implemented, which is to be applied to the initial values in order to obtain output values that more accurately reflect the actual height and position of the maximum, but which are significantly simpler to implement than, for example, a cosine interpolation.

Before the derivation of the determination relationship is discussed in more detail, according to FIG. 2 an exemplary embodiment of the method according to the invention will be explained in more detail in terms of its general procedure. The exemplary embodiment of FIG. 2 relates to determination of the time-of-flight difference between the upstream ultrasound signal and the downstream ultrasound signal, although in the scope of the present invention it is also possible in addition or as an alternative to determine an absolute time of flight of an ultrasound signal, by determining the envelope curve as accurately as possible by improved determination of the maxima of the individual half-waves of the ultrasound signal.

Figure 2:
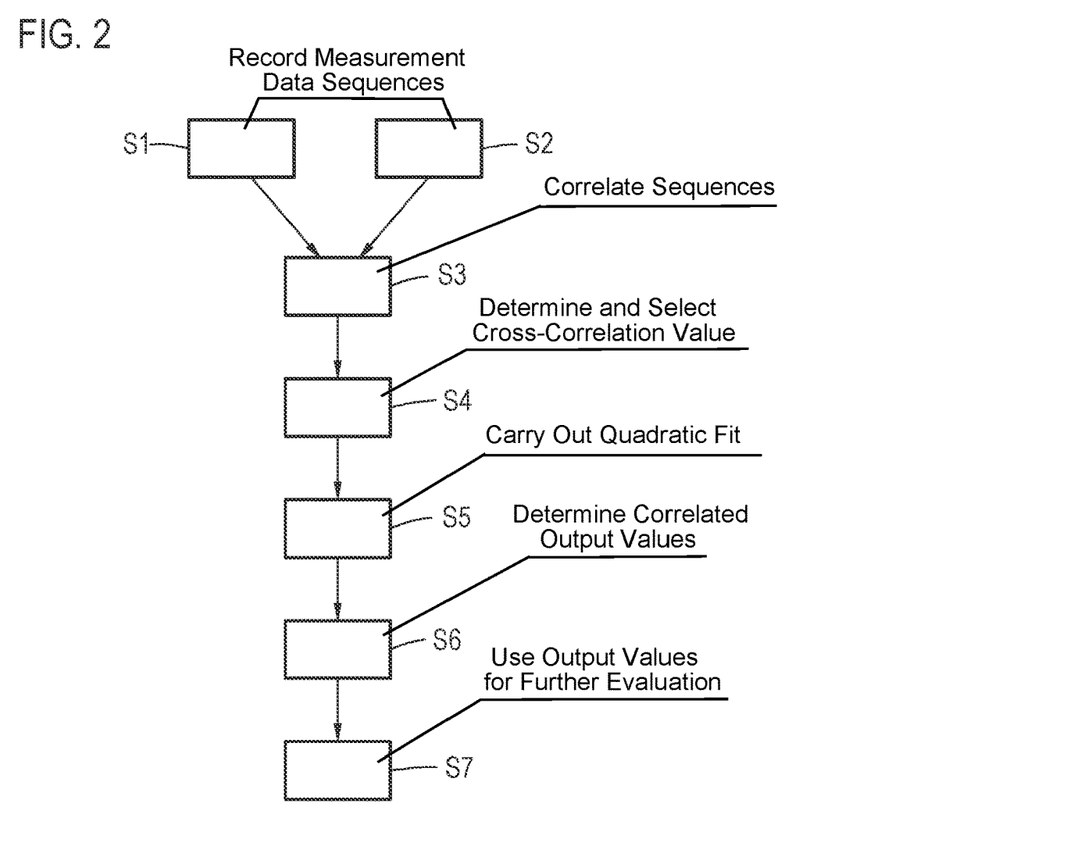
FIG. 2 is a flowchart of one exemplary embodiment of the method according to the invention.

According to FIG. 2, a measurement data sequence is respectively recorded in steps S1 and S2, in the present case an upstream measurement data sequence with the ultrasound transducer 5 and a downstream measurement data sequence with the ultrasound transducer 6. The two measurement data sequences are, as is widely known, correlated with one another in a step S3 in order to obtain a likewise discrete cross-correlation signal sampled with the recording frequency.

In a step S4, a maximum cross-correlation value of the time sequence of evaluation values, which is given by the cross-correlation signal, is determined and selected, to cross-correlation values, lying directly next to the maximum correlation value, of the time sequence being selected as further such cross-correlation values.

In a step S5, a quadratic fit of the selected cross-correlation values is then carried out in order to obtain initial values relating to the maximum, in the present case an initial maximum value and an initial maximum time.

In a step S6, a determination relationship is used, which, for a fixed previously known recording frequency and a fixed previously known signal frequency determines correlated output values, and therefore an output time describing the position of the maximum and an output height describing the height of the maximum, from the initial values relating to the maximum. The determination relationship has in this case been determined analytically and/or empirically on the basis of the actually known at least substantially sinusoidal profile in the ultrasound signal, as will be explained in more detail below. For example, the already mentioned Formulae (1) and (2) may be used as a determination relationship. The determination relationship furthermore requires a calculation quantity, which is derived from the selected cross-correlation values, or their measurement times. If, for example, Formulae (1) and (2) are used, a calculation quantity according to (0) will be used. Corresponding determination relationships may also be found for other suitable calculation quantities, for example for a calculation quantity which is determined from the difference of the measurement time of the maximum cross-correlation value (or general evaluation value) and the initial maximum time. Such a calculation quantity may be implemented particularly simply since formation of a difference is readily possible.

At this point, it should be stated that, with a fixed known recording frequency and a fixed known signal frequency, a correction is carried out which depends only on one further parameter, namely the calculation quantity, and may be implemented and carried out easily inside the microelectronic components 11 of the control device 9 as a look-up table and/or mathematical function in the case of sufficient simplicity.

In a step S7, the output values obtained may then be used for further evaluation, for example in order to determine a flow velocity, from which a flow quantity or the like may be derived as a final desired measurement quantity.

Figure 4:
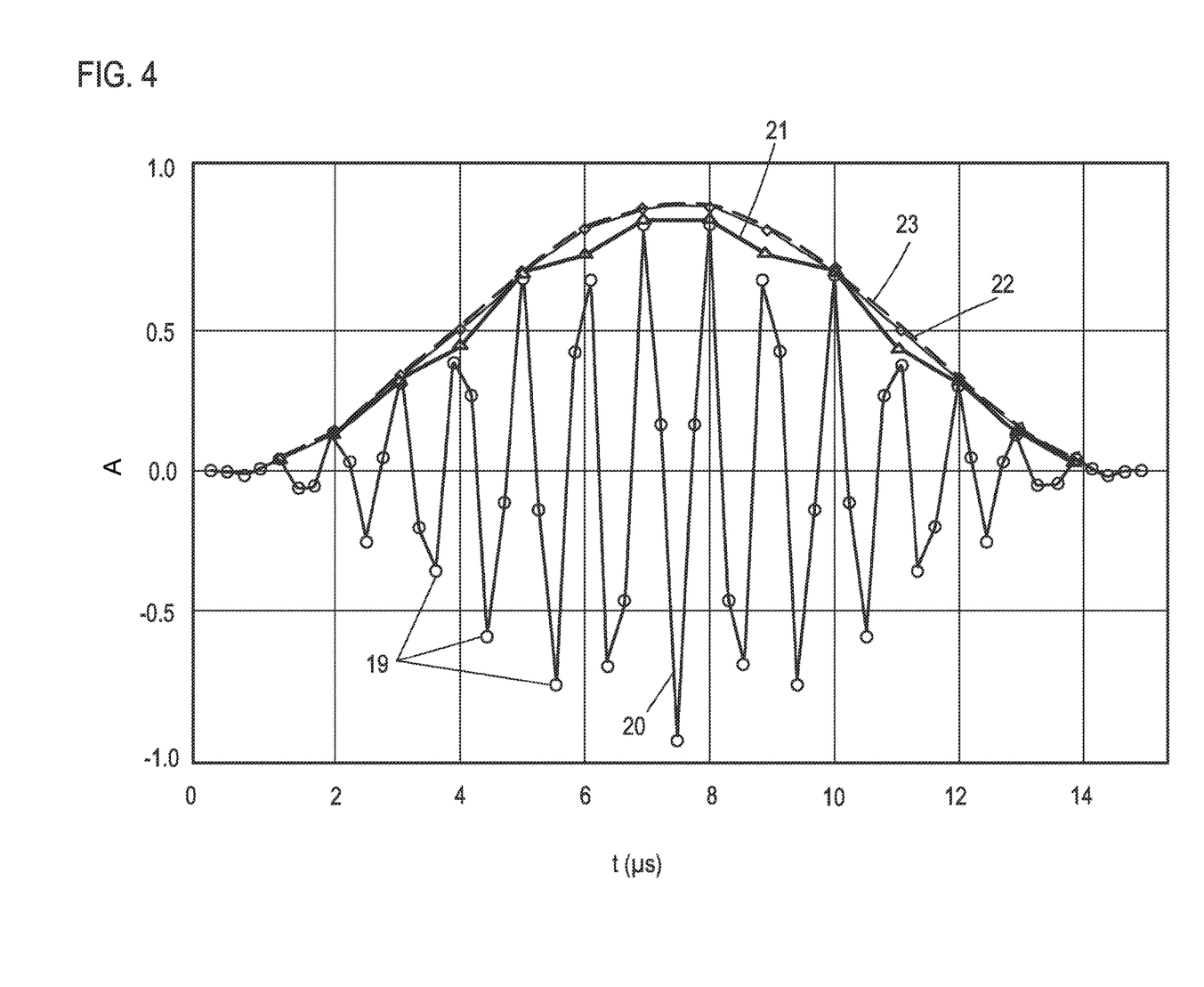
FIG. 4 is a diagram showing a reconstructed envelope of an ultrasound signal or cross-correlation signal.

FIG. 4 shows the improvements by the correction proposed according to the invention compared with the quadratic fit more accurately with respect to an example in which the maxima of an ultrasound signal are detected and fitted. First, by combining different measurement values 19, the rough profile 20 of the ultrasound signal in question, in this case an ultrasound pulse, is shown as a sampled signal. The triangular points, connected by the curve 21, indicate the heights and positions of the respective half-wave maxima determined with the quadratic fit, therefore corresponding to the initial values for the different maxima. The points marked by diamonds, connected by the profile 22, indicate the corrected positions and heights of the maxima, in the present case output values as a result of application of Formulae (1) and (2). As may be seen clearly, by looking at the actual envelope curve 23 shown by dashes, the corrections provide a significant increase in the quality of the fit.

Figure 5:
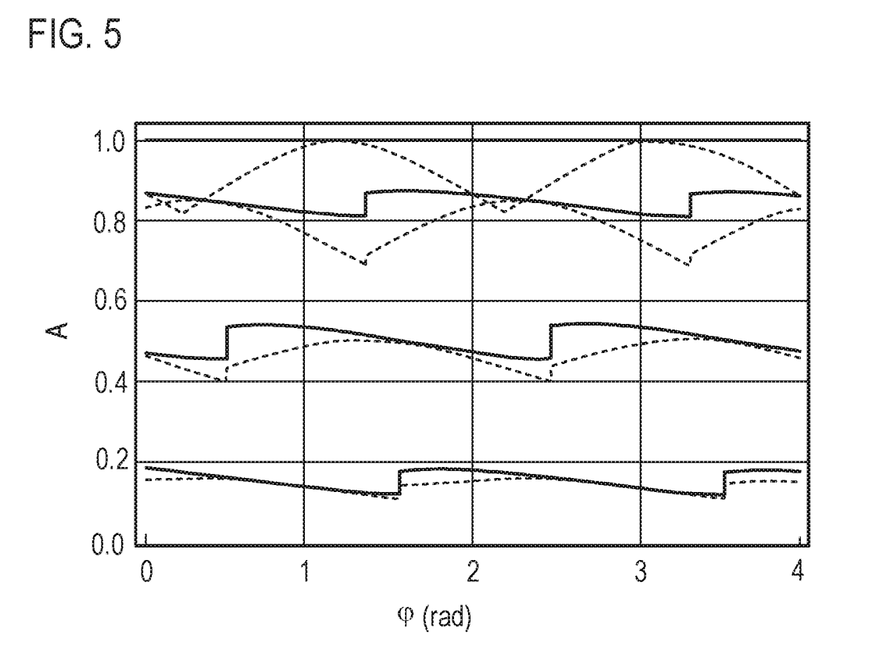
FIG. 5 is a diagram showing reconstructed amplitudes of individual maxima of a rising edge of an envelope curve of an ultrasound signal.

FIG. 5 shows the amplitude determined for different individual maxima of the ultrasound signal of FIG. 4 in the rising part of the envelope curve 23, plotted against the phase offset of the respective half-wave in relation to the measurement times. In this case, the dashed curves show results of the quadratic fit (initial values, i.e. specific initial maximum values), and the solid curves show output heights. It should be noted that, in practice, the phase offset varies with the temperature and the flow velocity, so that all phase values may conventionally occur. The effect of this is that in algorithms, as are described for example in the article by Fang, et al., in which individual maxima are intended to be identified by their amplitude or relative amplitude (shown in FIG. 6), the desire is that successive maxima may be separated as clearly as possible from one another. From FIGS. 5 and 6, it may be seen clearly that in the case of a pure quadratic fit, confusions may occur more easily in many ranges of the phase offset, which is undesired. When the correction is carried out, however, those problems do not occur.

Figure 6:
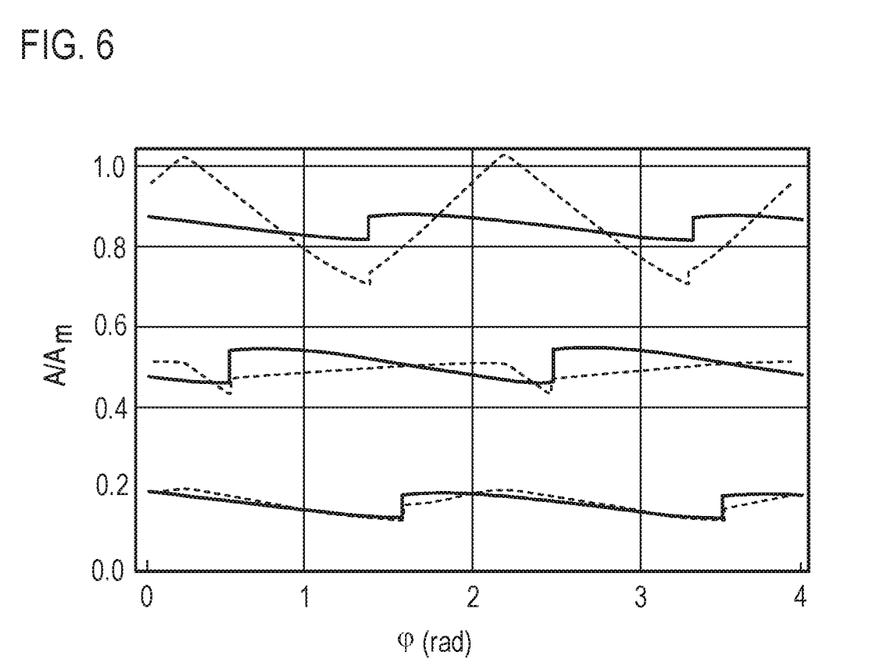
FIG. 6 is a diagram showing the reconstructed amplitudes relating to the reconstructed greatest amplitudes of the individual maxima of the rising edge.

It may, however, also be seen from FIGS. 5 and 6 that the correction appears inferior to the quadratic fit for maxima lying at the very start of the envelope curve, as is seen by the bottom two profiles in FIG. 5 and FIG. 6. The reason for this lies in the asymmetry of the individual maxima due to the increasing amplitude according to the envelope curve 23. Embodiments of the method according to the invention may therefore also be provided, in particular, empirically including the influence of the slope of the envelope curve 23 in the determination relationship, in order to improve the correction in this regard as well.

For simpler implementation by microelectronic components 11, in the case of determination relationships at least partially analytically derived, or present in the form of a mathematical function, provision may also be made to use approximation methods in order to obtain approximated expressions for the correction, so as to achieve a further reduced power requirement because of the simpler implementation.

It should be noted that in the case of using a look-up table and at least partial empirical determination of the determination relationship, the already mentioned asymmetry due to the envelope curve 23 may fairly naturally also be accommodated. It should furthermore be noted that the determination relationship, i.e. in particular a look-up table, may in principle also be determined as a function of the recording frequency and the signal frequency of the ultrasound signal, in particular when the recording frequency and the signal frequency cannot be assumed to be invariable for an ultrasonic flow measuring device 1. Particularly in relation to the signal frequency, it may moreover also be expedient to carry out a calibration measurement cyclically or when particular conditions are satisfied, in order to determine the current signal frequency, which may for example be dependent on the temperature, which may be determined by using the temperature sensor 7. In this case, calibration data may also be recorded with the recording frequency, in which case a Fourier analysis may deliver the signal frequency. It is also conceivable to proceed with a higher recording frequency during the calibration measurement, in order to be able to establish the length of the period between maxima and/or zero-crossings and therefore likewise to be able to determine the signal frequency accurately. This ensures that the appropriate correction is always applied. The calibration measurement need not be carried out for each individual measurement process, but only occasionally, for example cyclically, or when a change in the signal frequency is expected, for example in the event of a temperature change established by using the temperature sensor 7.

An analytical derivation of a determination relationship will also be described in more detail below. In this case, it is assumed that, for reasons of simple implementability with a low electrical power requirement, a quadratic fit is intended to be used in the evaluation of measurement data of the ultrasonic flow measuring device 1, when the interest is still in a maximum of a sinusoidal profile. In order to derive an analytical solution, in this case a pure cosine is initially assumed as an assumed actual profile, i.e. base function s(t), to which the parabola is intended to be fitted. The desired maximum in this case lies, for example, at $t=t_{max}$. This means that the base function may be written as $$s(t)=A_{max}\cos(2\pi f(t-t_{max})), \quad (3)$$

in which f is again intended to be the signal frequency of the underlying ultrasound signal. Specifically, this means that the true position of the maximum is $t_{max}$ and the true amplitude is $A_{max}=s(t_{max})$.

The evaluation values, for which the maximum is intended to be determined more accurately, are three preselected points $\{s_-, s_0, s_+\}$ on s(t), for which $s_-<s_0$ and $s_+<s_0$. These conditions will be referred to as Formula (4).

In this case, $s_0$ represents a rough approximation on the basis of the sampled evaluation values, while $s_-, s_+$ describe the data points chronologically before and after this. These three points are sampled with a sampling rate, i.e. recording frequency, $f_s$ at the times $\{t_-, t_0, t_+\}$ with $t_+=t_0+1/f_s$ and $t_-=t_0-1/f_s$. The range in which $t_0$ may lie is restricted by the conditions (4). It is found that $$t_0 \in ]t_{max} - \frac{1}{2f_s}, t_{max} + \frac{1}{2f_s}[. \quad (5)$$

If three general points with evaluation values and correspondingly assigned measurement times are considered, as defined above $\{\{t_0-1/f_s, s_-\}, \{t_0, s_0\}, \{t_0+1/f_s, s_+\}\}$, the position and the height of the maximum of the fitted parabola (corresponding to the initial values) are known, namely as $$t_{fit} = t_0 - \frac{1}{2f_s}\frac{s_+ - s_-}{s_+ + s_- - 2s_0}, \quad (6)$$

$$A_{fit} = \frac{2s_-(s_+ + 4s_0) - (s_+ - 4s_0)^2 - s_-^2}{8(s_+ + s_- - 2s_0)}.$$

For the quadratic fit, when selecting s(t) according to Equation (3), the fitted amplitude (initial maximum value) is given as $$A_{fit} = A_{max} \left[ \cos(2\pi f(t_0 - t_{max})) + \frac{\sin^2(2\pi f / f_s)\sin^2(2\pi f(t_0 - t_{max}))}{4\cos(2\pi f(t_0 - t_{max})) - 2(\cos(2\pi f(t_0 - t_{max}) - 1/f_s)) + \cos(2\pi f((t_0 - t_{max}) + 1/f_s)))} \right]. \quad (7)$$

This equation still depends on the phase $t-t_{max}$ of the sampling points relative to the centering around the true maximum. Since the actual phase is not known, Equation (7) above must be rewritten in terms of quantities that are known. Let the scaled difference $$\tilde{\Delta} = \frac{s_+ - s_-}{s_0} \quad (8)$$

between the evaluation values of the third and first points relative to the central point be defined as a measurement quantity. The following may then be written $$t - t_{max} = -\frac{1}{2\pi f}\arctan\left(\frac{\tilde{\Delta}}{2\sin(2\pi f / f_s)}\right) \quad (9)$$

and therefore $$A_{fit} = \frac{A_{max}\left(1 + \frac{\tilde{\Delta}^2}{32\sin^2(\pi f / f_s)}\right)}{\sqrt{1 + \frac{\tilde{\Delta}^2}{4\sin^2(2\pi f / f_s)}}} \approx A_{max}\left(1 - \frac{\Delta^2}{32\cos^2(\pi f / f_s)}\right). \quad (10)$$

The approximation shown in the bottom line of Equation (10) in this case applies only for small calculation quantities. Equation (10) may be rearranged for the true amplitude, which is intended to be determined, as $$A_{max} = A_{fit}\frac{\sqrt{1 + \frac{\tilde{\Delta}^2}{4\sin^2(2\pi f / f_s)}}}{\left(1 + \frac{\tilde{\Delta}^2}{32\sin^2(\pi f / f_s)}\right)}. \quad (11)$$

Since Equation (11) is unsuitable for simple implementation with ultralow electrical power in microelectronic components, the use of different approximation methods may in principle be envisaged. In particular, an attempt may be made to approximate Equation (11) in expressions of simple polynomial functions. If, for example, a Taylor expansion is carried out for small calculation quantities, the following is obtained $$A_{fit} \approx A_{max}\left(1 - \frac{\Delta^2}{32\cos^2(\pi f / f_s)}\right). \quad (12)$$

For recording frequencies $f_s$ that are not very high, however, the validity interval of this approximation is extremely restricted. A better selection may in this case be to carry out a linear or quadratic fit over the entire validity interval of possible calculation quantities, in which case the calculation quantity according to (8) may also be understood as a decentering value. The simplest way of carrying this out, which also allows analytical expressions, is the fitting of two points $A_{fit}(\tilde{\Delta}=0)=1$ and $A_{fit}(\tilde{\Delta}(t=1/(2f_s))=-2\sin(2\pi f/f_s)\tan(\pi f/f_s))=4[\cos(\pi f/f_s)(5-\cos(2\pi f/f_s))]^{-1}$.

This gives two approximate solutions for the real amplitude, and therefore the output height:

$$A_{max}^{(1)} = A_{fit}\left[1 + \frac{\left(1 + \frac{2}{\cos(\pi f / f_s)}\right)\tan^2\left(\frac{\pi f}{2f_s}\right)}{2(5 - \cos(2\pi f / f_s))}|\tilde{\Delta}|\right], \quad (13)$$

$$A_{max}^{(2)} = A_{fit}\left[1 + \frac{1 + \frac{2}{\cos(\pi f / f_s)}}{32\cos^4\left(\frac{\pi f}{2f_s}\right)(5 - \cos(2\pi f / f_s))}\tilde{\Delta}^2\right].$$

A corresponding procedure is also possible for the fitted position $t_{fit}$ of the maximum. The following is found $$t_{fit} = t_0 - \frac{1}{2f_s}\frac{\tan(2\pi f(t_0 - t_{max}))}{\tan(\pi f / f_s)}. \quad (14)$$

As a function of the calculation quantity, the fitted position of the maximum may be written as $$t_{fit} = t_{max} + \frac{\tilde{\Delta}}{8f_s\sin^2(\pi f / f_s)} - \frac{\tan^{-1}\left(\frac{\tilde{\Delta}}{2\sin(2\pi f / f_s)}\right)}{2\pi f}, \quad (15)$$

there being an independency on the real height $A_{max}$ of the maximum. Equation (15) may easily be rearranged for the true position of the maximum, giving $$t_{max} = t_{fit} - \frac{1}{2\pi f}\left[\frac{\pi f}{4f_s}\frac{\tilde{\Delta}}{\sin^2(\pi f / f_s)} - \tan^{-1}\left(\frac{\tilde{\Delta}}{2\sin(2\pi f / f_s)}\right)\right] \quad (16)$$

Unlike the height of the maximum, i.e. the amplitude, the correction of the quadratically fitted position is not a factor but an additive term. The following may therefore be written $$t_{max} = t_{fit} - \epsilon_t, \quad (17)$$

$$\epsilon_t = \frac{1}{2\pi f}\left[\frac{\pi f}{4f_s}\frac{\tilde{\Delta}}{\sin^2(\pi f / f_s)} - \tan^{-1}\left(\frac{\tilde{\Delta}}{2\sin(2\pi f / f_s)}\right)\right].$$

If a scaled decentering measure $\tilde{\Delta}/\tilde{\Delta}_{max}$ is defined, with $$\tilde{\Delta}_{max} = -2\sin(2\pi f/f_s)\tan(\pi f/f_s), \quad (18)$$

the maximum achievable error for a given recording frequency may be estimated as $$\epsilon_{t,max} = \quad (19)$$

$$\frac{1}{2\pi f}\left[\tan^{-1}\sqrt{\frac{\tan x}{x} - 1} - \frac{\sqrt{x\cos x - (\sin x - x\cos x)}}{\sin x}\right] \approx \frac{\pi^2 f^2}{9\sqrt{3}f_s^3},$$

$$\tilde{\Delta}_{\epsilon_t,max} = -4\sin x\sqrt{\frac{\cos x(\sin x - x\cos x)}{x}},$$

$$\tilde{\Delta}_{\epsilon_t,max}/\tilde{\Delta}_{max} = -\frac{1}{\tan(\pi/x)}\sqrt{\frac{\tan x}{x} - 1} \approx -\left(\frac{1}{\sqrt{3}} + \frac{\pi^2 f^2}{5\sqrt{3}f_s^2}\right),$$

where $x=\pi f/f_s$. With knowledge about the value and the position of the maximum error, the trigonometric Formula (17) may be approximated for example by a parabola or a triangular function. A quadratic fit using the real maximum error value and the real maximum error position is given as $$\epsilon_t^{(2,0)} = -\text{sgn}(\tilde{\Delta})\epsilon_{t,max}\left[1 - \frac{(|\tilde{\Delta}| + \tilde{\Delta}_{\epsilon_t,max})^2}{\tilde{\Delta}_{\epsilon_t,max}(\tilde{\Delta}_{\epsilon_t,max} - \tilde{\Delta}_{\epsilon_t,max})}\right]. \quad (20)$$

Since an extremely complex expression is obtained when everything is rewritten for the calculation quantity $\tilde{\Delta}$, two approximations should be produced. On one hand, the parabola should be centered around $\tilde{\Delta}=1/2$ instead of around the point $\tilde{\Delta}_{\epsilon_t,max}$, which is more complex to determine. The following is then obtained for the time correction term:

$$\epsilon_t^{(2,1)} = -\text{sgn}(\tilde{\Delta})\epsilon_{t,max}\left[1 - 4\left(\left|\frac{\tilde{\Delta}}{\tilde{\Delta}_{max}}\right| - \frac{1}{2}\right)^2\right]. \quad (21)$$

Nevertheless, problematic trigonometric functions still occur in the evaluation of $\epsilon_{t,max}$, but these only need to be calculated once and only change if the sampling frequency and/or the signal frequency change. A simpler approach is offered by using the approximation in Equation (19) for $\epsilon_{t,max}$ and $\tilde{\Delta}_{max} = -4(\pi f/f_s)^2 + 4/3(\pi f/f_s)^4 - 8/45(\pi f/f_s)^6$ (when $f_s$ increases, more terms may be neglected in the approximation of $\tilde{\Delta}_{max}$). The following is obtained:

$$\epsilon_t^{(2,2)} = \quad (22)$$
$$-\text{sgn}(\tilde{\Delta})\frac{\pi^2 f^2}{9\sqrt{3}\,f_s^3}\left[1 - 4\left(\left|\frac{\tilde{\Delta}}{-4(\pi f/f_s)^2 + 4/3(\pi f/f_s)^4 - 8/45(\pi f/f_s)^6}\right| - 1/2\right)^2\right].$$

It may be stated that the approximation of the amplitude is better for higher recording frequencies. However, the approximation of the maximum by $\tilde{\Delta}_{\epsilon_t,max=}1/2$ makes an increasingly poor contribution. A refinement of this approximation may therefore be carried out by the formulae in Equation (19). In the simplest form, for example for a recording frequency of 3.6 MHz, the maximum error may already be reduced from 15 ns to about 2.5 ns.

Figure 7:
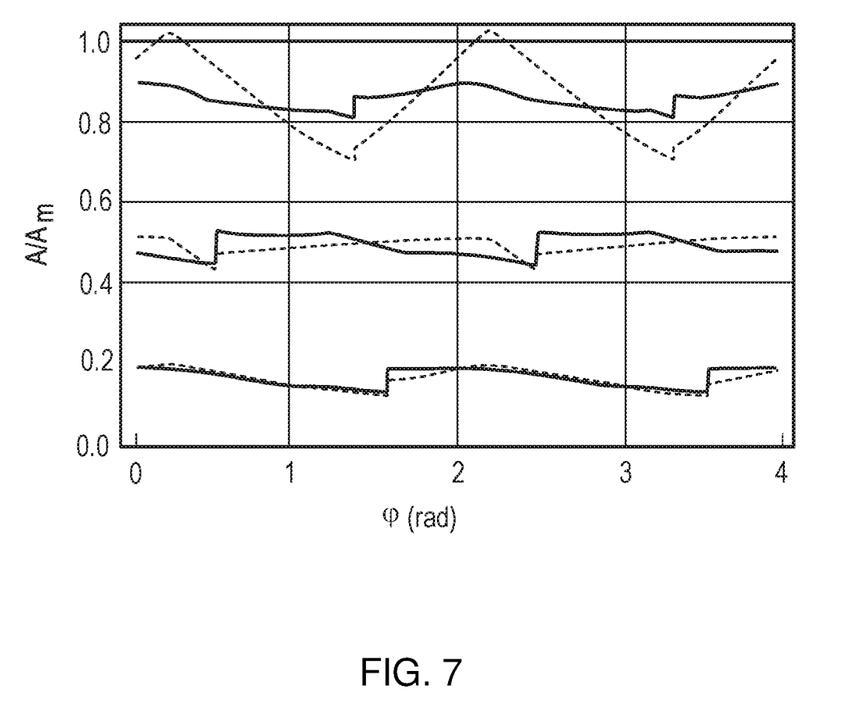
FIG. 7 is a diagram showing reconstructed amplitudes relating to the reconstructed maximum amplitudes of the individual maxima of the rising edge when using an approximation function.

FIG. 7 in turn shows, in comparison with FIG. 6, relative heights of the maximum of the rising edge of the envelope curve 23 of an ultrasound pulse, Hann-windowed with a length of 8 cycles, as a function of the phase offset of the ultrasound phase in relation to the measurement times. In this case, however, the linear approximation $\Delta_{max}^{(1)}$ according to Formula (13) has been used for the corrections, again represented by solid lines. As may be seen, even more significant advantages over the quadratic fit are obtained in relation to the possibility of separating different maxima of the ultrasound pulse/ultrasound signal.

LIST OF REFERENCES 1 flow measuring device
2 housing
3 line
4 flow direction
5 ultrasound transducer
6 ultrasound transducer
7 temperature sensor
8 energy source
9 control device
10 analog-digital converter
11 microelectronic component
12 output device
13 curve
14 measurement value
15 measurement value
16 measurement value
17 measurement value
18 curve
19 measurement value
20 profile
21 curve
22 profile
23 envelope curve
S1-S7 steps

The invention claimed is:

1. A method for evaluating discrete measurement data sequences of an ultrasonic flow measuring device, recorded with a recording frequency and respectively describing an at least substantially sinusoidal ultrasound signal with a signal frequency, the method comprising the following steps being carried out in order to determine at least one of a time position or height of at least one maximum of the at least substantially sinusoidal profile of a time sequence of evaluation values, being determined as at least one of at least a part of a measurement data sequence or at least a part of a cross-correlation of two measurement data sequences recorded at different measurement positions of the ultrasonic flow measuring device:

determining a maximum evaluation value of the time sequence and at least two evaluation values of the time sequence being adjacent the maximum evaluation value;

determining initial values, including an initial maximum value and an initial maximum time, by a quadratic fit of selected evaluation values; and determining output values including at least one of an output time describing the position of the maximum or an output height describing the height of the maximum by using a determination relationship setting the output values in relation with the initial values and at least one calculation quantity formed from the selected evaluation values for a known recording frequency and a known signal frequency and being derived on a basis of the known sinusoidal profile.

2. The method according to claim 1, which further comprises carrying out the evaluation by at least one of using at least one microelectronic component for digital signal processing of a control device of the ultrasonic flow measuring device or using the determined output values to determine at least one of a time-of-flight difference or an absolute time of flight of the ultrasound signal or signals.

3. The method according to claim 1, which further comprises at least one of determining or using the determination relationship as at least one of a look-up table relating at least to the calculation quantity or a mathematical function.

4. The method according to claim 1, which further comprises at least partially deriving the determination relationship analytically.

5. The method according to claim 4, which further comprises carrying out the analytical derivation of the determination relationship on the basis of a fit relationship linking the initial maximum time and the initial maximum value with the selected evaluation values, the time of the maximum evaluation value and the recording frequency, by:

applying a base function describing the sinusoidal profile, the selected evaluation values forming function values of the base function at their times and the output values being taken as describing the maximum of the base function lying in a range of the selected evaluation values;

formulating an intermediate relationship between the initial values and the output values; and reformulating by using the calculation quantity of the intermediate relationship in the determination relationship.

6. The method according to claim 4, which further comprises simplifying the analytically determined determination relationship by carrying out at least one approximation method for simpler implementation in digital signal processing, including at least one of a linear approximation method or a Taylor expansion.

7. The method according to claim 6, which further comprises applying a plurality of approximation methods for different validity intervals of the calculation quantity, and using the determination relationship determined from the assigned approximation method according to a current value of the calculation quantity.

8. The method according to claim 1, which further comprises at least partially empirically determining the determination relationship.

9. The method according to claim 8, which further comprises using an ultrasound signal described by an envelope curve initially increasing in its amplitude and then decreasing to zero, measuring the ultrasound signal with the measurement data sequences, carrying out the at least partial empirical determination at least one of separately for the region of increasing amplitudes and for the region of decreasing amplitudes or as a function of a slope value of the envelope curve, and the determination relationship at least one of differing between the regions or being determined as a function of the slope value.

10. The method according to claim 1, which further comprises adapting the determination relationship as a function of calibration data of a calibration measurement.

11. The method according to claim 10, which further comprises at least one of using the calibration measurement for determining the signal frequency or carrying out a repetition of the calibration measurement at least one of cyclically or when at least one ambient criterion evaluating an ambient condition is satisfied, or upon a change, exceeding a threshold value, in a temperature to a value for which there are no calibration data.

12. An ultrasonic flow measuring device, comprising:
at least one ultrasound transducer; and
a control device evaluating measurement data of said at least one ultrasound transducer, said control device including an analog-digital converter and at least one microelectronic component for digital signal processing being configured for carrying out the method according to claim 1.

* * * * *